Sept. 13, 1960　　　F. ROSTRON　　　2,952,106
EGG HANDLING PLANT

Filed June 17, 1958　　　　　　　　6 Sheets-Sheet 1

Inventor
Frank Rostron
by Albert Jacobs
Attorney

Sept. 13, 1960     F. ROSTRON     2,952,106
EGG HANDLING PLANT

Filed June 17, 1958     6 Sheets-Sheet 4

Inventor
Frank Rostron
by Albert Jacobs
Attorney 2,952,106
Patented Sept. 13, 1960

2,952,106

EGG HANDLING PLANT

Frank Rostron, Westbury, England, assignor to Newman, Hender and Company Limited, Trowbridge, England, a British company Filed June 17, 1958, Ser. No. 742,680

Claims priority, application Great Britain June 19, 1957

5 Claims. (Cl. 53—55)

This invention relates to egg handling plant and in particular to mechanism for filling standard egg trays with their complement of eggs. The object of the invention is to provide a machine which will receive and effectively deal with eggs whereby they are filled into trays mechanically and thereby reduce labour costs which are involved in the manual filling of trays with eggs, as received for example, from an egg grading machine. The invention is particularly applicable for combination with the mechanism for orientating or positioning eggs of copending application Serial No. 741,576, now U.S. Patent No. 2,895,589, the eggs being delivered from such mechanism to an egg tray filling machine of the present invention.

According to the invention, an egg tray filling machine comprises an endless conveyor adapted to receive eggs one by one along the under-run thereof and build up and retain them as a group of a predetermined number in line formation, means for the releasing each group of eggs upon reaching such predetermined number to an egg tray for example arranged below the under-run of the conveyor.

Preferably, the eggs are delivered to the receiving conveyor from a secondary conveyor means being provided whereby the passage of the eggs therefrom to the receiving conveyor actuates an electrical switch device controlling the movement of clutch mechanism adapted to operate the receiving conveyor step by step.

Preferably, the receiving conveyor carries switch operating means controlling a solenoid whereby the release of a group of eggs of a predetermined number from the receiving conveyor is effected.

The egg trays are carried below the filling mechanism by a continuously moving endless conveyor band means being provided to hold the tray at a line of recesses therein so that the continuously moving conveyor slips under the tray whilst the eggs are being deposited therein. It will be appreciated that the delivery mechanism, the receiving conveyor, the actuation of the latter, the release of a group of eggs and the movement of the tray step by step are all electrically controlled in synchronism.

In order that the invention may be clearly understood and readily carried into effect, reference is directed to the drawings accompanying the provisional specification, wherein.

Figure 1:
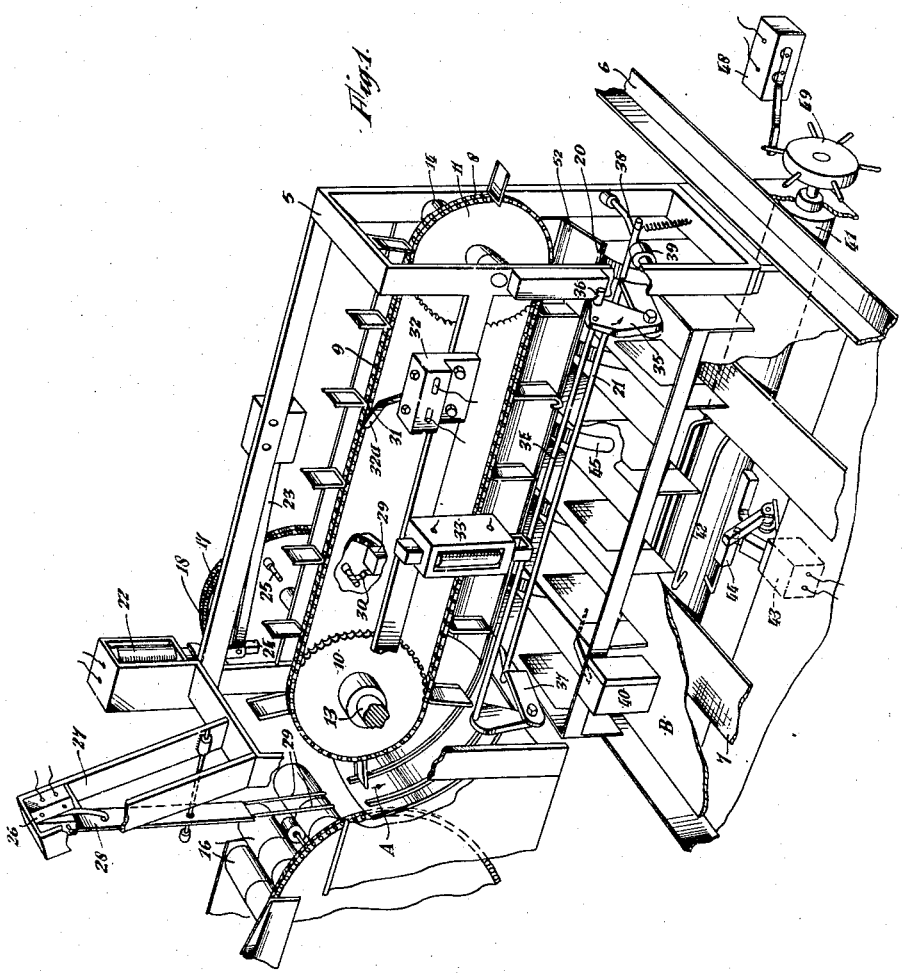
Figure 1 is a perspective view partly broken away of one form of an egg tray filling machine according to the invention.

Referring to the drawings, 5 indicates a main frame supporting the egg tray filling mechanism and carried on fixed longitudinal members 6, below which a tray conveyor 7 is continuously moved. The frame 5 supports a conveyor 8 comprising a chain 9 mounted on spockets 10 and 11 at the receiving and opposite end of the conveyor respectively, the sprockets being mounted on shafts 13 and 14 of which the former is positively driven. The chain 9 carries at spaced intervals and upstanding therefrom blades 15 between which eggs are received and carried in the direction of the arrow "A" carried by the blades 15 along the lower run of the conveyor and held thereto by means hereinafter described, the eggs being delivered to the conveyor 8 by a feed conveyor 16. The shaft 13 is keyed to a pair of spring loaded clutch plates 17 frictionally engageable with a continuously driven pinion 18 driven from a driving pinion 19. The operation of the clutch is such as to permit the conveyor 8 to move step by step as each egg is received from the feed conveyor 16 and deposited between adjacent blades 15. The eggs when received by the conveyor 8 are carried along the bottom run thereof and are supported at their base ends on a rubber covered bar 20 which extends the full width of the machine and fixed at each end in side plates 20a in combination with a rod 21 parallel with the bar 20 but moveable thereto to release the eggs as a group when the spaces between the blade members 15 at the under-run of the conveyor are filled, usually five or six in number to correspond with the number of recesses running transversely of a standard egg tray.

Figure 2:
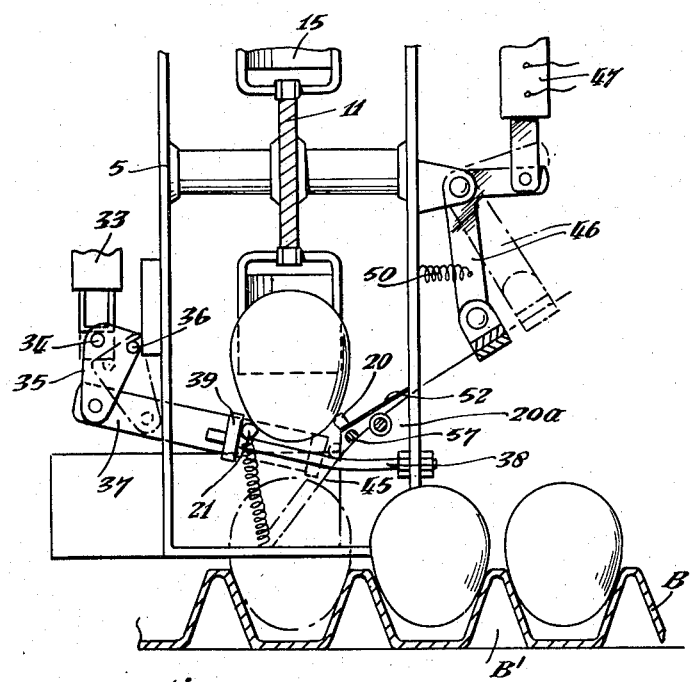
Figure 2 is a section substantially on the line II—II of Figure 1.

The operation of the clutch mechanism whereby the conveyor 8 is moved step by step is controlled by a solenoid 22, the core of which is linked to an arm 23 pivoted on the frame 5 of the machine. The arm 23 carries a lug 24, cooperated with a pin 25 of which four are provided equidistantly spaced around the clutch. The solenoid 22 is energised by a switch 26, mounted on a support 27 fixed to the frame 5 and overhanging the feed conveyor 16. The switch 26 is provided with a swinging switch arm 28, the free end of which is constituted by a pair of fingers 29 adapted to be engaged by an egg as it is fed to the conveyor 8 from the feed conveyor 16 and thereby rocked to close the switch and thus energise the solenoid 22. This action frees the lug 24 from the pin 25 with which it is in holding engagement and allows the clutch plates 17 to rotate a quarter turn equal to one space between the blades 15. The switch 26 is in a series with a switch 29 attached to the frame of the machine and has a switch operating arm 30 which normally engages a pin 25 to complete the circuit through the switch 26 but which breaks the circuit of the switch 26 immediately the lug 24 has released the preceding pin 25, the arrangement being such that the switch arm 28 is ineffective until the clutch has completed one quarter turn and the circuit again completed by re-engagement of the switch arm 30 with the following pin 25. In order to regulate the number of eggs into a group in line formation and control their discharge to the trays (with the particular arrangement described, 5 eggs constitute a group) the chain 9 is provided with a number of contact pins 31 which cooperate in turn with a switch 32 controlling a solenoid 33 adapted to actuate the egg release mechanism, i.e. the bar 21, to permit the eggs to fall when a group of five has been assembled. The pins 31 are placed adjacent every sixth blade 15 of the conveyor and so arranged that when a complete group is formed the switch 32 is closed through the intermediary of its switch arm 32a and the solenoid is energised and the eggs as a result, fall into a tray indicated in Figure 2 by the reference "B." The core of the solenoid 33 is connected to a rod 34 extending across the machine and fixed at each end to a rocker 35 pivoted to the frame of the machine 5 as at 36 the rockers are each pivotally connected to one end of a link 37 attached at their other ends to the bar 21, which bears up its ends on fixed guide members 38 provided with an adjustable limit stop. Actuation of the solenoid 33 forces the links 37 inwards to move the bar 21 from the front of the egg where it normally rests to a position at the rear of the egg just below the fixed bar 20 so that the eggs are left unsupported and drop into the egg tray "B"; the inward movement of the links 37 and bar 21 being shown in dotted lines in Figure 2, a spring 21a assists the movement of the mechanism.

The release of the group of eggs is utilised in their fall to operate a switch 40 to control mechanism holding the tray "B" in a fixed position relative to the filling machine the mechanism comprising a roller 41 carrying a number of U-shaped radial arms 42 adapted to engage a row of recesses B1 of an egg tray and hold it stationary, whilst the conveyor 7 slips thereunder, actuation of the switch 40 on the fall of a group of eggs operates a solenoid 43 controlling the movement of the roller 41 through an obturator 44 engageable with the members 42 in turn.

In order to facilitate the fall of a group of eggs into the row of recesses in the tray a series of spring blade members 45 arranged to be projected under the eggs at the moment of release to prevent falling eggs touching eggs already packed and to this end the blade members 45 are carried on a spring loaded double lever 46, actuated by a solenoid 47 simultaneously with the actuation of the solenoid 33 to release the eggs. The solenoid 47 is energised by a control switch 48 actuated by a pinwheel 49 integral with the roller 41 so that when a group of eggs is released the switch 40 is closed to energise the solenoid 43 to release a member 42 resulting in the tray "B" being carried forward by the conveyor 7, until re-engaged by the succeeding member 42 the roller 41 rotating one step and the switch 48 being closed simultaneously to energise the solenoid 47. By this means, the lever 46 is projected forwardly against the action of a spring 50 to place the spring blades 45 in a position to ease the fall of the eggs as they drop in group formation, the blades 45 bear on a fixed rod 51 extending the width of the machine between the side plates 20a and below a cover plate 52 the forward edge of which meets the bar 20.

Figure 4:
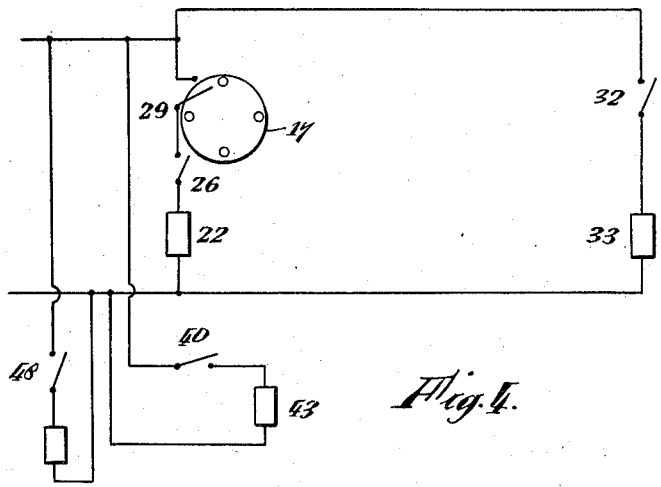
Figure 4 illustrates an electrical diagram by means of which the egg tray filling machine is controlled.

Figure 4 illustrates an electrical circuit diagram by means of which the synchronous action of the parts are controlled, that is to say the step by step motion of the conveyor 8 of the release of a group of eggs to a tray and the movement of the tray step by step in synchronism in addition to the secondary movements of the parts.

Figure 5:
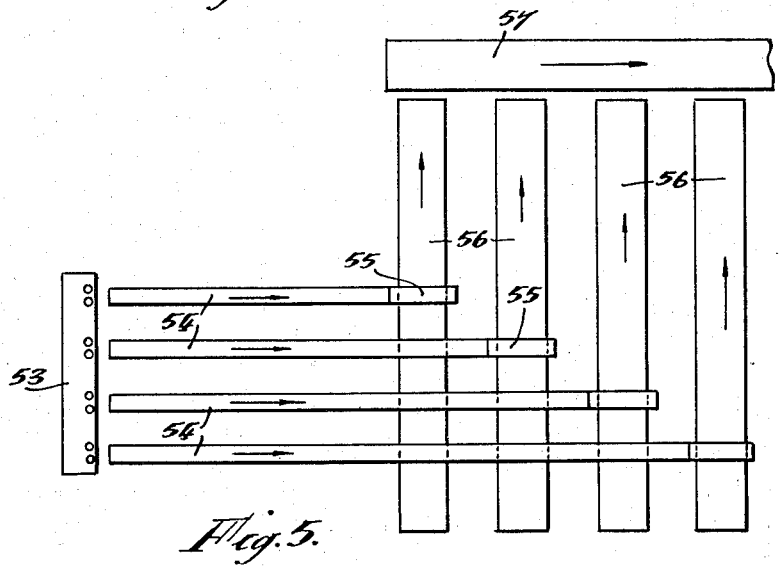
Figure 5 illustrates diagrammatically an assembly of egg tray filling machines as associated with an egg grading machine and other apparatus.
Figure 3:
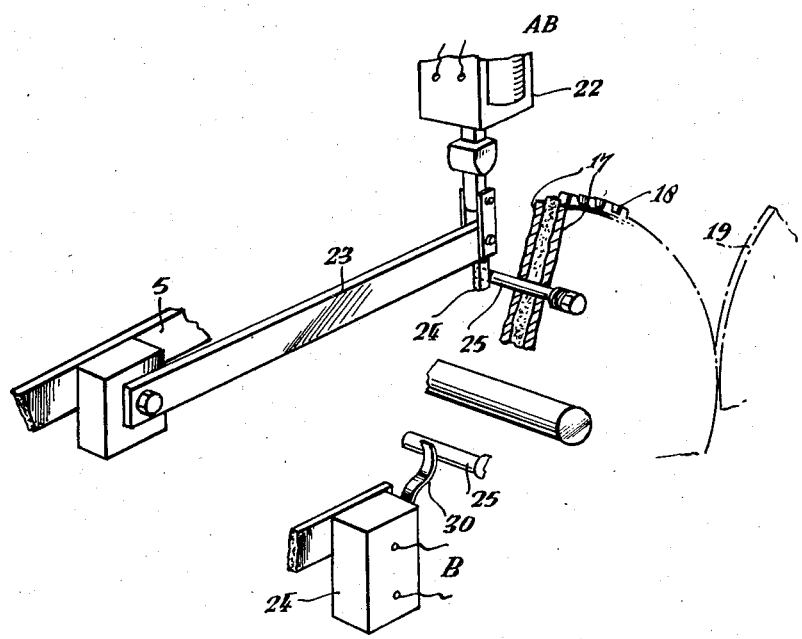
Figure 3 is a perspective view illustrating a detail.

Figure 5 illustrates diagrammatically an arrangement of egg handling plant in which the present invention is embodied together with the egg orientating mechanism of co-pending application Serial No. 741,576. In the aforesaid figure, 53 is an egg grading machine of known construction which delivers eggs in pairs of differing weights to an orientating mechanism 54 which in turn feed eggs to the egg tray machine 55 of the present invention, conveyors 56 feeding empty and taking away the filled egg-trays in the direction of the arrows and depositing them on a main conveyor 57.

Figure 6:
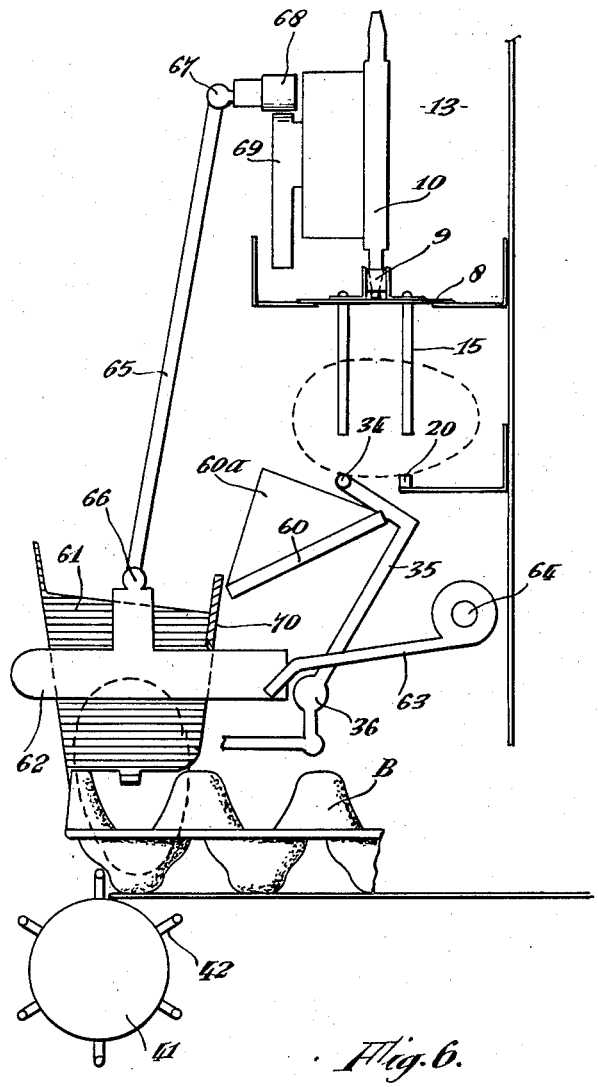
Figures 6, 7 and 8 illustrate diagrammatically and sequentially a modified form of guide means for receiving a group of eggs from the egg tray filling machine and delivering them to an egg tray.
Figure 7:
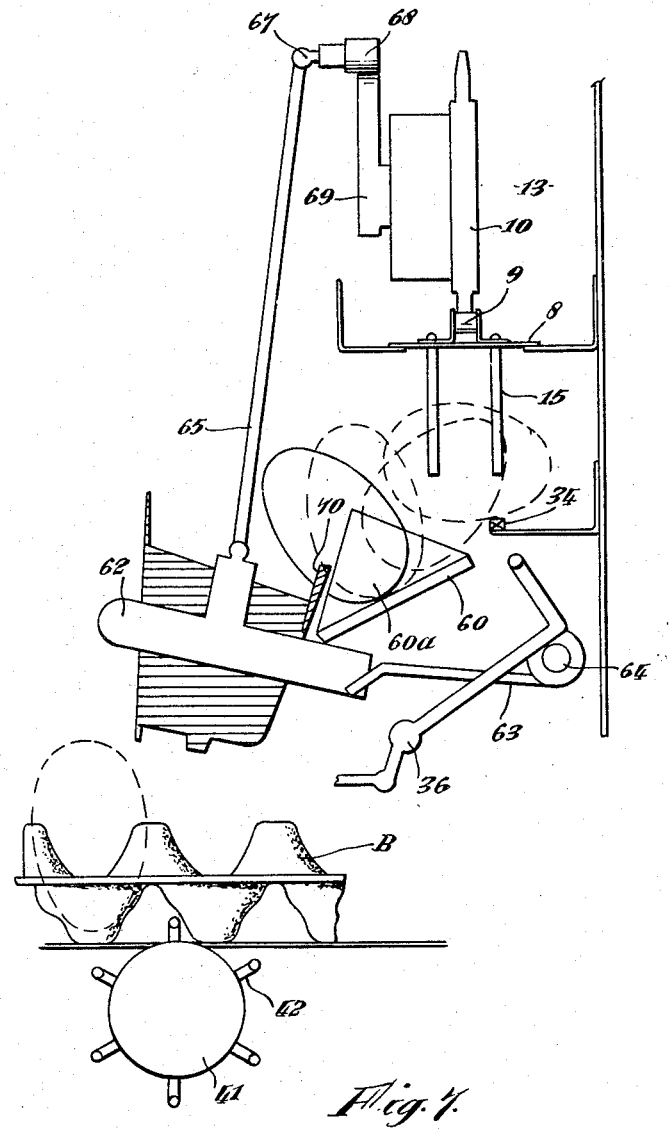
Figure 8:
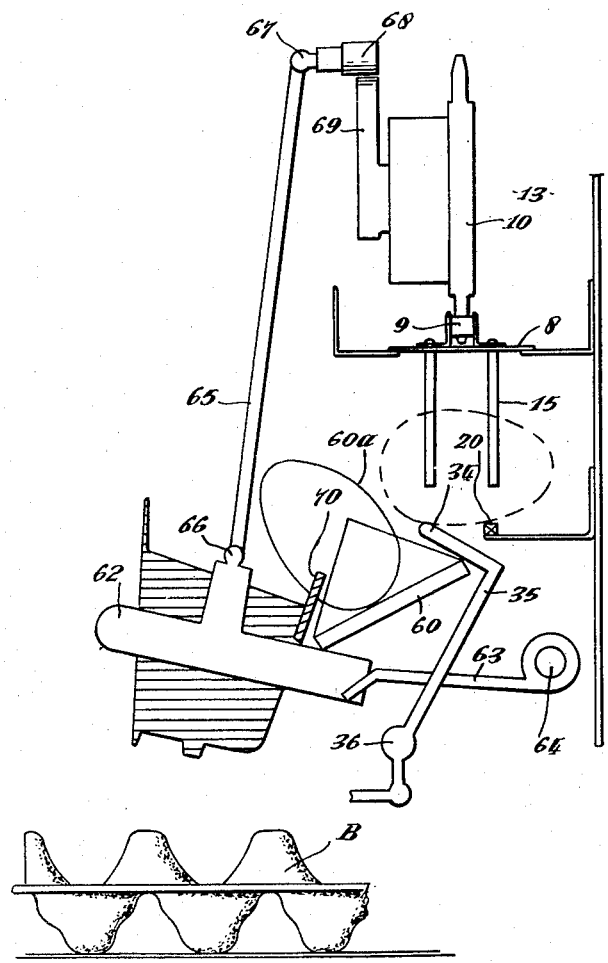

Referring now to Figures 6, 7 and 8 which show an alternative means of directing or guiding a group of eggs from the conveyor 8, when assembled in line on the bar 20 and rod 34. With the construction illustrated, when the bar 34 is rocked on its pivot 36 by a cam control linkage as previously described, releases the group of eggs to a fixed runway 60 which is separated into pockets by partitions 60a. The eggs from the runway are delivered to individual cups 61, a row of which are mounted on a frame member 62, carried by arms 63 at each end and rockable on a pivot by means of a link 65 pivoted at one end as at 66 to the frame 62 and at the other end as at 67 to a cam follower 68 which co-operates with a cam 69. The cam 69 is keyed on the shaft 13 of the sprocket 10 which drives the conveyor 8 by the chain 9.

When the described delivery mechanism is in operation and upon a group of eggs being completed, the release bar 35 is withdrawn from the position shown in Figure 6 to allow the group of eggs to fall into the runway 60 as shown in Figure 7, prior to this operation, the egg receiving cup frame 62 has been raised through the intermediary of the cam 69 and connecting link 65 to such a position that an egg stop 70 of rubber running the length of the egg cups 61 is in such a position as to prevent the eggs from falling immediately into the cups as shown in Figure 8 and this dwell is such as to allow the release bar 34 to return to the position indicated in Figure 6 before the first egg is delivered to the conveyor 8; continued operation of the conveyor 8 and consequently rotation of the cam 69 causes the egg cups 61 to gradually lower to a position where the egg stop 70 no longer forms an obstruction to the group of eggs on the runway and allows them to fall and be deposited in an egg tray B carried by the conveyor 7, the egg tray being held by the members 42 of the roller 41 which operates as previously described.

The cam 69 is so profiled as to bring the cups 61 clear of the deposited row of eggs in an egg tray and to permit the latter to move one step, ready for the reception of the next group of eggs.

What I claim and desire to secure by Letters Patent is:

1. An egg delivery machine comprising an endless conveyor adapted to receive eggs one by one along the underrun thereof and retain them as a group of a predetermined number in line formation, a secondary conveyor operable to feed eggs to the egg receiving conveyor, an electric switch device, a swingable switch arm to actuate said switch device and operated by the passage of eggs from said secondary conveyor to said egg receiving conveyor and clutch mechanism operatable to move said receiving conveyor step by step, a solenoid, a core for said solenoid, said swingable switch arm being linked to said core, a lug mounted on said arm and adapted to co-operate with one of a plurality of pins fixed to and equidistantly spaced around the clutch mechanism, said swinging switch arm overhanging the secondary conveyor and operable to energise said solenoid, the free end of said switch arm being constituted by a pair of fingers adapted to be engaged by an egg as it is fed to the egg receiving conveyor by the secondary conveyor the rocking of said switch arm being adapted to close the switch and thus energise the solenoid to free the lug from the clutch pin to render the clutch mechanism inoperative to move a distance equal to one egg space of the egg receiving conveyor.

2. An egg delivery machine as claimed in claim 1, a plurality of contact pins equidistantly spaced along the conveyor, a switch controlled solenoid, said pins being spaced apart a distance equivalent to the predetermined number conforming to the required group at least at every fifth egg space on the conveyor and so arranged that when a complete group is formed, the switch is closed through the intermediary of a contact pin, and the solenoid is energised to actuate the egg release mechanism.

3. An egg delivery machine for delivering a group of eggs to an egg tray comprising an intermittently movable endless conveyor, blades mounted at spaced intervals along said conveyor and extending outwardly therefrom to provide recesses between said blades for the reception of eggs, means for causing step-by-step travel of said conveyor so that it receives eggs one by one along the underrun and retains them as a group of a predetermined number in line formation, means for releasing the predetermined number of eggs as a group when the predetermined number is reached, a continuously movable endless conveyor band located below said intermittently movable endless conveyor, an egg tray carried by said endless band between said band and said conveyor, means for moving said band and the egg tray carried thereby and means for holding such tray at a line of egg receiving recesses while a group of eggs is being released from the egg receiving conveyor and a secondary conveyor arranged to feed eggs to the egg receiving conveyor and means responsive to the passage of eggs from said secondary conveyor to said egg receiving conveyor to control movement of said egg receiving conveyor.

4. An egg delivery machine as claimed in claim 3, wherein the means for releasing the predetermined number of eggs as a group includes lugs carried by the egg receiving conveyor, an electric switch operated by said lugs and a solenoid energizable by operation of said switch.

5. An egg delivery machine as claimed in claim 3, wherein a series of spring blade members are arranged to be projected under the eggs at the moment of release.

References Cited in the file of this patent
UNITED STATES PATENTS

| | | |
|---|---|---|
| 1,568,082 | Milton | Jan. 5, 1926 |
| 2,045,767 | Funk | June 30, 1936 |
| 2,552,620 | Christian | May 15, 1951 |
| 2,590,823 | Rhodes | Mar. 25, 1952 |